United States Patent [19]
Martuch et al.

[11] 3,758,979
[45] Sept. 18, 1973

[54] TAPERED LEADER FOR FLY FISHING

[75] Inventors: Leon L. Martuch, Midland; Edward J. Russell, Gladwin, both of Mich.

[73] Assignee: Scientific Anglers, Inc., Midland, Mich.

[22] Filed: Sept. 9, 1971

[21] Appl. No.: 179,035

[52] U.S. Cl................ 43/44.98, 161/166, 161/179
[51] Int. Cl............................................. A01k 91/00
[58] Field of Search............... 43/44.98; 161/179, 161/166

[56] References Cited
UNITED STATES PATENTS

| 3,512,294 | 5/1970 | Howald | 43/44.98 |
| 3,453,769 | 7/1969 | Chandler | 43/44.98 |
| 3,464,140 | 9/1969 | Carabasse | 43/44.98 X |
| 1,914,174 | 6/1933 | Smith | 43/44.98 X |
| 2,862,282 | 12/1958 | Beebe | 43/44.98 X |

Primary Examiner—Louis G. Mancene
Assistant Examiner—Daniel J. Leach
Attorney—Gordon W. Hueschen et al.

[57] ABSTRACT

A novel tapered leader for fly fishing comprising a strength-supplying core, composed of a butt and a tippet end, and a weight-increasing coating which increases the weight of the leader but does not appreciably affect the stiffness of the leader. The leader may be knotless or sectional and joined together.

20 Claims, 4 Drawing Figures

PATENTED SEP 18 1973 3,758,979
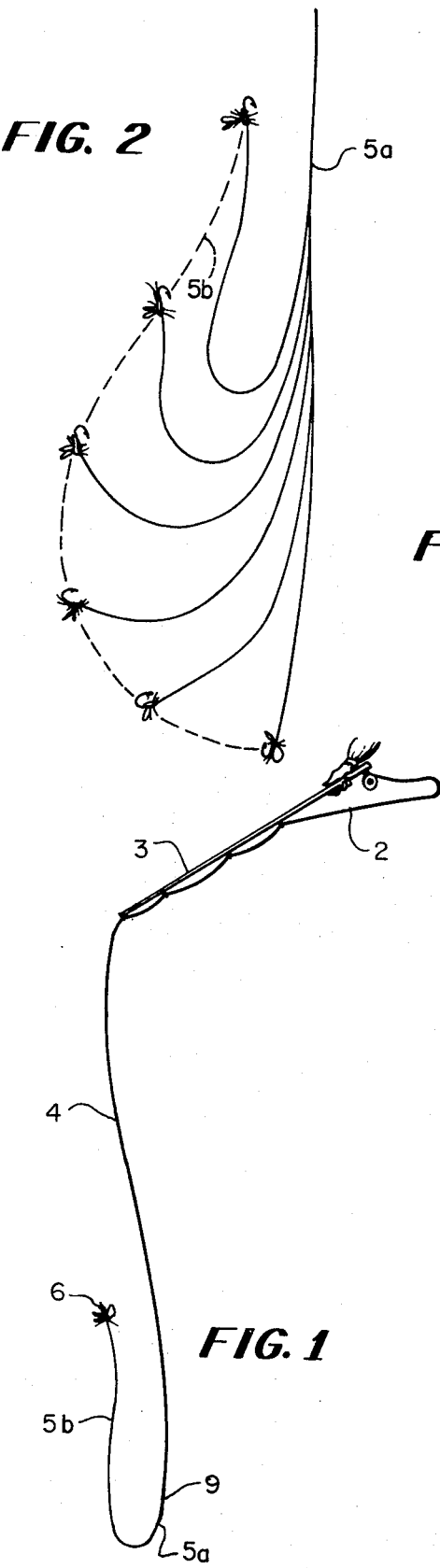
FIG. 2
FIG. 3
FIG. 1
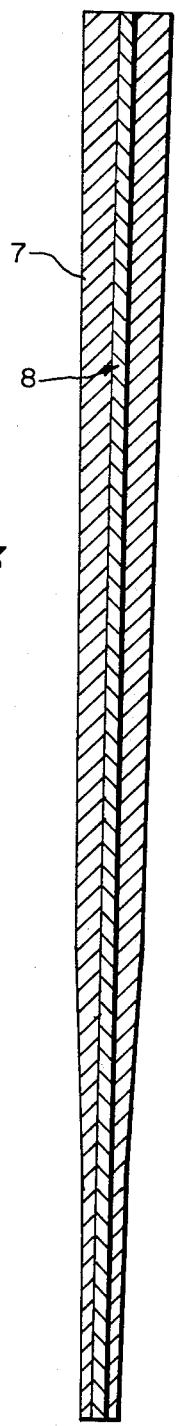
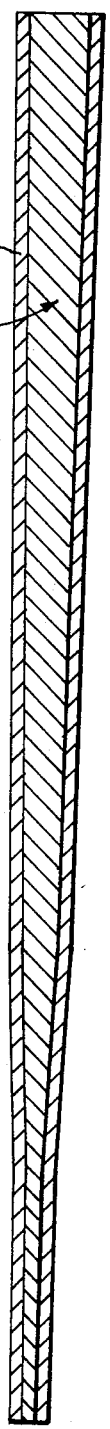
FIG. 4
INVENTOR
LEON L. MARTUCH
EDWARD J. RUSSELL
BY
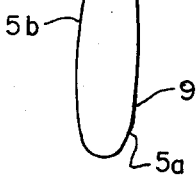
ATTORNEY

TAPERED LEADER FOR FLY FISHING

This invention relates generally to a new, useful and unique tapered leader for fly fishing. More particularly, this invention relates to a new, useful and unique tapered leader wherein weight is added to the leader without appreciably affecting the stiffness of the leader.

BACKGROUND

This invention relates to a tapered leader of particular value in fly fishing.

Lines used in fly fishing are usually much larger in diameter and much heavier than are the lines used in other types of angling. This presents a problem in that the line is too large for attachment directly to the fly. Its larger diameter also would present a distraction, by shadow, et cetera, to the fish.

A leader is therefore used which provides the necessary and proper connection between the line and the fly. This connection provides less distraction for the fish and permits the fly to drop gently on the water surface creating less disturbance to the water surface which may frighten the fish.

In order to provide the proper connection between a line and a fly, the diameter of the leader is different, sometimes considerably, at the two ends of the leader.

A good fly fishing leader should have a high tensile strength at the minimum diameter, good knot strength — i.e., the ability to be knotted without substantial loss in tensile strength — and should also have the ability to straighten out completely at the end of the cast.

All of these properties must be combined in the leader in a way which does not appreciably increase the stiffness of the leader, thus providing the maximum in casting characteristics.

In the past, leaders consisted of several sections knotted together, each section usually having a progressively smaller diameter. From this practice a rule of thumb developed in which the butt section, that section connected to the fishing line, comprised approximately 60 percent of the leader length. The tippet section, that section tied to the fly and having the smallest diameter, comprised approximately 20 percent of the leader length. The remaining section, having diameters intermediate to those of the butt and tippet sections, connected the butt and tippet sections and comprised the remaining approximately 20 percent of the leader length.

Following the past practice, it has also developed (we feel erroneously) that for good casting characteristics, the butt section should be composed of material which is stiffer than the tippet section material.

A knotted leader has several apparent disadvantages such as bulkiness of the knots which make them visible to the fish and their tendency to cath up weeds and other material in the water. There is also an important cost factor in the manufacture of a knotted leader.

Knotless leaders have been made and are described in the art such as U.S. Pat. Nos. 2,559,080; 2,774,173 and United Kingdom Pat. No. 749,348.

It has been found, however, that these knotless leaders do not present the best casting characteristics because of the inability to obtain the most desirable diameter relationship between the butt and tippet sections. If the butt sections of these leaders are large enough in diameter to connect with the fishing line and provide the proper momentum to the leader and fly, the tippet section diameter is too large. The converse was also found to be true, i.e., if the tippet was of the proper small diameter, the butt section was too small in diameter for proper connection to the fishing line and for providing of the proper momentum to the leader and fly.

The overcoming of this disadvantage was attempted in U.S. Pat. No. 3,453,769, wherein the tapered leader was divided into two parts, a stiff butt section and a less stiff tippet section. Each of the two sections are tapered. The two sections are joined to form the complete leader.

This two part leader, although it overcame some of the disadvantages found in the prior leader, exhibits other disadvantages not previously experienced. The stiff butt section has a tendency to "curl," and this "curl" is difficult to remove. The stiff butt section also has a tendency to spring open during a cast thereby increasing the air resistance and preventing the desired straightening of the leader.

All previously manufactured leaders, whether knotted or knotless, had a ratio of the modulus of elasticity of the tippet section to the modulus of elasticity of the butt section of 1.0 or less. All of the one piece knotless leaders were constructed of a single homogenous material. The average modulus of elasticity, therefore, was the same at all points on the leader, regardless of the diameter. Knotted leaders were usually constructed of a consistent material throughout. If materials having different modulus of elasticity coefficients were used, the more limp materials having lower modulus of elasticity coefficients were used at the tippet end, as taught in U.S. Pat. No. 3,453,769. Leaders in which the modulus of elasticity of the tippet section is less than that of the butt section have a ratio of modulus of elasticity coefficients of less than one. Leaders having a modulus of elasticity at the butt end less than that of the modulus of elasticity at the tippet end have a ratio of more than one.

A tapered leader has now been found which overcomes the disadvantages enumerated above. In this novel leader weight and not stiffness is the controlling factor.

It is thus an object of the present invention to provide a leader which has none of the disadvantages encountered with the use of the prior art leaders.

It is another object of this invention to provide a novel tapered leader for fly fishing.

Another object of this invention is to provide a novel tapered leader for fly fishing where weight, not stiffness, is the controlling factor.

Still another object of this invention is to provide a novel knotless tapered leader for fly fishing.

Another object of this invention is to provide a novel tapered fly fishing leader which will transport the fly in a manner which provides maximum use of the energy imparted by the angler.

Another object of this invention is to provide a novel tapered fly fishing leader wherein the butt section has an average modulus of elasticity lower than that of the average modulus of elasticity of the tippet section.

Another object of this invention is to provide a novel tapered fly fishing leader wherein because of the lower modulus of elasticity and larger diameter at the butt end of the leader, the butt end of the leader is much less stiff than is the tippet end.

Other objects and advantages of this invention will be apparent from a consideration of the following decription.

DESCRIPTION OF THE DRAWINGS

FIG. 1 is a side view of the equipment used for fly fishing.

FIG. 2 is a fragmental side view showing a fly and leader in motion during a cast.

FIG. 3 is a cross-sectional view of the fishing leader having a constant diameter core.

FIG. 4 is a cross-sectional view of the fishing leader having a tapered core.

Fly casting differs from all other types of casting in that the fly or lure has essentially no weight of its own and must rely on the line and leader to provide the necessary weight for the cast. The energy required for the casting of a fly is imparted to the line and leader by the angler through the fly rod. The kinetic energy of the leader is determined by its speed and weight, according to the formula $KE=MV^2/2$ where $KE$ is the kinetic energy, $M$ is the weight and $V$ is the speed, Since the speed is imparted by the angler in the casting motion, the kinetic energy of the leader is dependent on its weight. Every portion of the leader should have sufficient kinetic energy to overcome the air resistance "drag," generated by the outward movement of the leader and the fly. Since, in a cast, a leader acts as a loop which rolls forward, the weight located at each point along the length of the leader is important as is the size of the loop.

With reference to FIG. 1, the leader 5a and 5b shows the proper depth of a loop during a cast — 5a being the bottom of the loop and 5b being the top of the loop. Element 6 is the fly being cast. The fishing line is denoted by the numerals 2 and 4. Element 4 is that portion of the fishing line which extends out from the rod 3 and is used in the cast. Element 2 is the slack line which is the extra line provided for extension during the cast. A properly executed cast will carry the fly out to the distance provided by the length of the slack line. Element 9 is the connection joining the leader to the fishing line.

In casting, the rod 3 is thrust forward pulling the line 4, the leader 5 and the fly 6. As the rod 3 is stopped, a loop is formed in the fishing line 4. This loop travels through the total length of the line 4 and the leader 5.

A leader formed in a narrow loop, such that illustrated in FIG. 1, will encounter less resistance to the forward motion than will a leader formed in a wider loop. The shape of the loop in the leader is dependent upon the shape of the loop in the fly line 4, which precedes it in the cast. It is also dependent upon the stiffness of the material from which the leader is made.

If the butt section of the leader is made of a relatively stiff material, it will resist the loop formation and would tend to open — widen the height — of the loop. This causes a springing action in the leader and a widening of the loop, instead of a rolling action of a small loop. The increase in loop height increases the frontal area of the loop which is subject to wind resistance. The increased wind resistance prevents the slack line from being carried forward completely and also prevents the leader from straightening completely at the conclusion of the cast.

Any stiffness of the leader which tends to "spring" apart the loop should be reserved for the tippet section. The springing action, therefore, should not occur until the tippet section of the leader is in the loop. A springing action at this time would result in the tippet section going through a wider arc, meeting greater air resistance which results in a very rapid dissipation of kinetic energy and thereby allowing the fly to fall gently to the water. This motion of the tippet is shown in FIG. 2.

Reserving the stiffness of the leader, and thus the springing action to the tippet section, has not been known prior to this invention and is contrary to the teaching in the prior art, especially U.S. Pat. No. 3,453,769 cited previously. The coating of a leader in order to provide additional weight also has not been known prior to this invention.

Referring to FIGS. 3 and 4, element 8 is the core of the leader which provides the necessary strength for the leader and element 7 is the coating which supplies the weight to the leader.

The core 8 can either be of relatively constant diameter, as in FIG. 3, or tapered as in FIG. 4. The overall leader configuration is tapered. The tapering effect may begin at the butt section and taper continuously to the tippet section or taper in the butt section with a leveling off in the middle section followed by a further tapering in the tippet section or the taper may begin close to the tippet section with the remaining portion being level. This tapering effect applies to all cases whether the taper is due to the coating or the core or both.

The core material may be a monofilament or multifilament in a braided form or laid side by side. It is preferred that the core is monofilament.

The core may be made of the same type of material used to make fishing lines. These include, but are not limited to, nylon, dacron and other synthetic fibers and silk, with nylon being preferred.

Although the preferred leader of this invention is knotless, the leader may be made of two sections, the butt section and the tippet section. The length occupied by the knot and the weight of the knot is too small, compared to the overall leader, to effect the performance of a leader made according to this invention.

A typical nylon monofilament which can be used in the present invention is HEROX (E. I. duPont Co.) which is a nylon material and has the following approximate properties: dry stiffness — 650 thousand pounds per square inch; tensile strengh — 62 thousand pounds per square inch; elongation — 36 percent; melting point — above 490° F; and specific gravity — 1.14.

The core material of the present invention is not required to have the above properties but they are cited to illustrate a commercially available monofilament having acceptable properties. The stiffness of the leader of this invention at any point along its length is a function of the following factors: (1) the modulus of elasticity of the core, (2) the cross sectional area and shape of the core, (3) the modulus of elasticity of the coating, and (4) the cross sectional area and shape of the coating. Any desired final stiffness of a leader at any point along its length can easily be obtained by varying these factors. The modulus of elasticity of the core material can easily be determined or is made available by the commercial producer of the core material and is usually in the range of about 300 thousand to 750 thousand pounds per square inch. The thickness, and therefore cross sectional area and shape, of the coating can be controlled by the coating process.

It is preferred that the core material be a monofilament commonly referred to as the hard or stiff type, having a modulus of elasticity of about 650,000 pounds per square inch. However, because the diameter, hence cross sectional area, of the core material is much smaller at the butt end of the leader than would be the butt end of the previously available leader, the comparative stiffness of the core material would be much less than the stiffness of the butt end of present leaders. The coating material, which adds the weight necessary for proper casting performance to the butt end of the leader, has a very low modulus of elasticity. The resulting overall average modulus of elasticity of the butt end of the leader is therefore much less than that of previously available leaders. By the coating process, a ratio of the average modulus of elasticity at the tip compared to the average modulus of elasticity at the butt of at least 1.1 is readily achieved.

As stated previously, many core materials, monofilament or multifilament which can be utilized in this invention, are commercially available and easily adapted for use.

Although the core material may have a relatively constant diameter or be tapered, the coating should preferably always be tapered. With a constant diameter core, the tapering of the leader is due to a tapering in thickness of the coating.

By the application of a coating material having a low modulus of elasticity to a core material having a relatively high modulus of elasticity, a tapered leader is produced such that the overall average modulus of elasticity at the tippet end is preferably 1.5 times the overall average modulus of elasticity at the butt end. This, as was stated previously, is contrary to the prior art which has the material in the butt section having a modulus of elasticity of at least as large and in some cases considerably greater than the modulus of elasticity of the material in the tippet section.

The construction of a leader having a constant diameter strength supplying core requires that the coating be tapered. Since the core material has a known modulus of elasticity and in the case of a constant diameter it also has a constant cross sectional area and shape, the stiffness supplied by the core will be constant over the length of the leader. In order to accomplish the desired ratio of overall average modulus of elasticity, it is required that the coating at the butt section be thicker than the coating at the tippet section.

The addition of a coating with a very low modulus of elasticity coefficient will reduce the overall average modulus of elasticity of the butt section. The tippet section having less coating would retain a greater overall average modulus of elasticity sufficient to achieve the desired ratio of greater than 1.5. The spring action would thus be reserved to the tippet section.

For leaders having a core tapering from a larger diameter at the butt end to a smaller diameter at the tippet end, the coating must also be tapered to provide a greater stiffness at the tippet section. The tapered core would, as do presently available knotless tapered leaders, have the same modulus of elasticity at the butt and tippet ends. The larger diameter at the butt end, however, would make the butt end considerably stiffer than the tippet end. In order to reduce the overall average modulus of elasticity at the butt end sufficiently to provide the desired stiffness relationships, a larger amount of coating of a low modulus of elasticity material would be required than would be required with a non-tapered core. If the core material is not uniformly tapered and the coating material not uniformly tapered over the core, varying proportions of core material and of coating material may be produced at different points along the leader. Thus, the overall average modulus of elasticity may be varied from one portion of the leader to another and with varying diameters a wide range of variation in stiffness is possible. In the case of a leader having a continuously tapered core from the butt end to the tippet end with a constant amount of the same coating being applied along the length of the leader, the tippet section would be less stiff than the butt section and the leader would be outside the scope of this invention.

A tapering of both the core and the coating can be so regulated that the desired modulus of elasticity ratios of greater than 1.5 are achieved.

Utilizing a tapered core and tapered coating, the stiffness of the two sections are usually closer to being the same.

It is thus seen that many degrees of differences between the stiffness of the butt and tippet sections can be obtained depending upon whether a uniform core or tapered core is selected.

It is apparent from the above discussion that the ratio of modulus of elasticity of the tippet section to the butt section of at least 1.1 can also be achieved by a coating, as herein described, of the butt section with the tippet section being free of coating or substantially free of the coating. The modulus of elasticity of the tippet section will thus be essentially that of the core material. It is preferred, however, that the entire leader be coated even though the amount of coating, i.e., thickness of coating, on the tippet section does not substantially affect or change the modulus of elasticity of the core material in the tippet section.

The application of a tapered coating to a core is easily accomplished by the known processes utilizing existing commercial apparatus. One of the available processes utilizes a series of sets of grooved wheels in which the depth of the groove decreases along the series. Another method may utilize a single set of grooved wheels in which the depth of the groove decreases along the circumference of the coating wheel.

The application of the coating, prior to passing the coated leader between the wheels, may be accomplished easily by passing the leader through a coating bath. The coating adheres to the leader and is then tapered by the wheels.

The coating which may be used to increase the weight of the core material may be of any composition compatible with the core material and preferably conventional coatings now used for coating fishing lines and which have a modulus of elasticity less than that of the core material.

The coating material may have a specific gravity of less than one, in which case the leader would float, or a specific gravity of more than one, in which case the leader would sink.

Polyvinyl chloride is the most commonly used surface coating, but the coating of this invention is not restricted to polyvinyl chloride. In practice the vinyl chloride may be copolymerized with other monomers such as vinyl acetate or may be a block copolymer, that is, having mainly polyvinyl chloride which is then polymerized with a vinyl chloride — vinyl acetate copolymer.

The polymer is usually finely divided and dispersed in a solvent — plasticizer — and the suspension is known as a plastisol. In many cases more than one plasticizer is used. Examples of plasticizers which may be used include but are not limited to di-octyl adipate, di-2-ethylhexyl phthalate, dicapryl phthalate, tricresyl phosphate and trioctyl phosphate.

The ratio of polymer to plasticizer is dependent upon the polymer and plasticizer and can easily be determined from available literature. For a polyvinyl chloride plastisol this may vary from about 30 to about 70 parts by weight of plasticizer per 100 parts by weight of polyvinyl chloride.

A stabilizer is normally incorporated in the plastisol in an amount of about one to four parts by weight per 100 parts by weight of polymer. When polyvinyl chloride is utilized, the stabilizer is a material which can pick up hydrogen chloride liberated from the polyvinyl chloride. This includes, but is not limited to, metallic soaps (lead, zinc, cadminium, et cetera) and epoxides.

Depending upon the properties desired, other substances can be added to the plastisol to vary the coating properties. Specific gravity of the coating can be increased by the addition of resins or resin-type plasticizers to the plastisol.

Increased elasticity of the coating can be obtained by the addition of polymerized unsaturates, acrylic or methacrylic esters of glycols such as trimethylol propane trimethacrylate, ethylene glycol dimethacrylate, 1,3-butanediol dimethacrylate, triethylene glycol dimethacrylate and the like. These polymerized unsaturates can be added in an amount of about 3–15 percent of the weight of the plastisol.

A typicl plastisol formulation which has been utilized comprises the following components (parts are by weight):

| | |
|---|---|
| Polyvinyl chloride (Geon 121) | 100 parts |
| Dioctyl adipate | 40 parts |
| Epoxidized tall oil (Flexol EPS) | 10 parts |
| Lead soap | 3 parts |

The core material is passed through a bath of the above plastisol and then between rollers to taper the leader. The coating is cured at about 375° C. either during the tapering process or subsequent to the tapering process.

Any other known process for coating, tapering and/or curing can also be utilized in the above process.

While the illustrative embodiments of this invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A tapered leader for fly fishing having a butt section and a tippet section, comprising a filamentous core having a relatively high modulus of elasticity and a coating on said core which tapers from the butt section to the tippet section and which increases the weight of the leader but does not appreciably affect the stiffness thereof, the said coating having a relatively low modulus of elasticity, whereby the stiffness of said tippet section is greater than the stiffness of the butt section.

2. A tapered leader for fly fishing according to claim 1, wherein the tapered leader is a knotless leader.

3. A tapered leader for fly fishing according to claim 2, wherein the core is a monofilament.

4. A tapered leader for fly fishing according to claim 3, wherein said monofilament is nylon.

5. A tapered leader for fly fishing according to claim 4, wherein the modulus of elasticity of the core is in the range of about 300 thousand to 750 thousand pounds per square inch.

6. A tapered leader for fly fishing according to claim 5, wherein the core is of uniform diameter.

7. A tapered leader for fly fishing according to claim 6, wherein the coating is a polyvinyl plastisol.

8. A tapered leader for fly fishing according to claim 1, wherein the butt section and the tippet section are separate sections connected to each other.

9. A tapered leader for fly fishing according to claim 8, wherein the core of each section is monofilament nylon.

10. A tapered leader for fly fishing according to claim 1, wherein said coating is substantially absent from said tippet section.

11. A tapered leader for fly fishing according to claim 10, wherein the tapered leader is a knotless leader.

12. A tapered leader for fly fishing according to claim 11, wherein the core is a monofilament.

13. A tapered leader for fly fishing according to claim 12, wherein said monofilament is nylon.

14. A tapered leader for fly fishing according to claim 13, wherein the modulus of elasticity of the core is in the range of about 300 thousand to 750 thousand pounds per square inch.

15. A tapered leader for fly fishing according to claim 12, wherein the core is of uniform diameter.

16. A tapered leader for fly fishing according to claim 15, wherein the coating is a polyvinyl plastisol.

17. A tapered leader for fly fishing according to claim 1, wherein the ratio of overall modulus of elasticity of the tippet section is at least 1.1 times the modulus of elasticity of the butt section.

18. A tapered leader for fly fishing according to claim 17, wherein said ratio is at least 1.5.

19. A tapered leader for fly fishing according to claim 1, wherein said coating has a specific gravity greater than 1.

20. A tapered leader for fly fishing according to claim 1, wherein said coating has a specific gravity less than 1.

* * * * *